United States Patent
Hörnig

(10) Patent No.: US 7,548,608 B2
(45) Date of Patent: Jun. 16, 2009

(54) FLAT X-RAY DETECTOR AND METHOD FOR CONTROLLING THE IMAGE DOSE EMITTED BY AN X-RAY TUBE TO A FLAT X-RAY DETECTOR WHEN RECORDING AN X-RAY IMAGE

(75) Inventor: Mathias Hörnig, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 33 days.

(21) Appl. No.: 11/790,360

(22) Filed: Apr. 25, 2007

(65) Prior Publication Data
US 2008/0164417 A1    Jul. 10, 2008

(30) Foreign Application Priority Data
Apr. 26, 2006    (DE) .................... 10 2006 019 416

(51) Int. Cl.
*G01T 1/24* (2006.01)
(52) U.S. Cl. ............. 378/98.8; 250/370.09; 250/370.11
(58) Field of Classification Search ................ 378/19, 378/98.8; 250/370.09, 370.11, 368
See application file for complete search history.

(56) References Cited

U.S. PATENT DOCUMENTS

| | | | |
|---|---|---|---|
| 7,227,152 B2 | 6/2007 | Brabec et al. | |
| 7,351,978 B2 | 4/2008 | Spahn | |
| 2005/0173641 A1* | 8/2005 | Unger et al. | 250/370.09 |
| 2007/0278413 A1* | 12/2007 | Katagiri et al. | 250/368 |
| 2008/0099689 A1* | 5/2008 | Nygard et al. | 250/370.09 |

FOREIGN PATENT DOCUMENTS

| | | |
|---|---|---|
| DE | 4405233 C1 | 5/1995 |
| DE | 10313602 | 10/2004 |
| DE | 10327038 A1 | 1/2005 |
| DE | 102004060870 A1 | 6/2006 |

\* cited by examiner

*Primary Examiner*—Hoon Song
(74) *Attorney, Agent, or Firm*—Harness, Dickey & Pierce, P.L.C.

(57) ABSTRACT

According to at least one embodiment of the invention, the measurement of an image dose is performed in the flat X-ray detector itself. The flat X-ray detector, in at least one embodiment, has a scintillator that converts the incident X-rays into light. The actual image signals are then generated in a light converting layer. A portion of the light generated by the scintillator is branched off, with the use of fiber optic elements, to at least one photocounter. The fraction of the branched off light is fixed, that is to say a measured value determined by the photocounter is proportional to the image dose. It is thereby possible to determine the image dose provisionally during image recording, and to intervene for control purposes by, if appropriate, changing the image recording period (beam time on X-ray tube) and the operating voltage of an X-ray tube during the image recording.

18 Claims, 3 Drawing Sheets

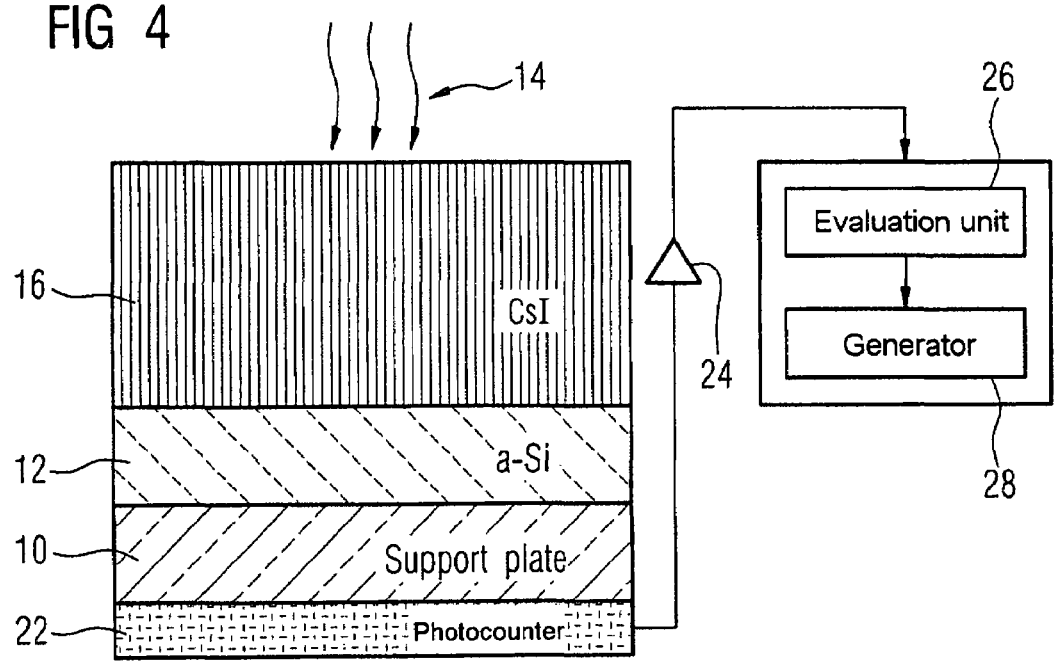
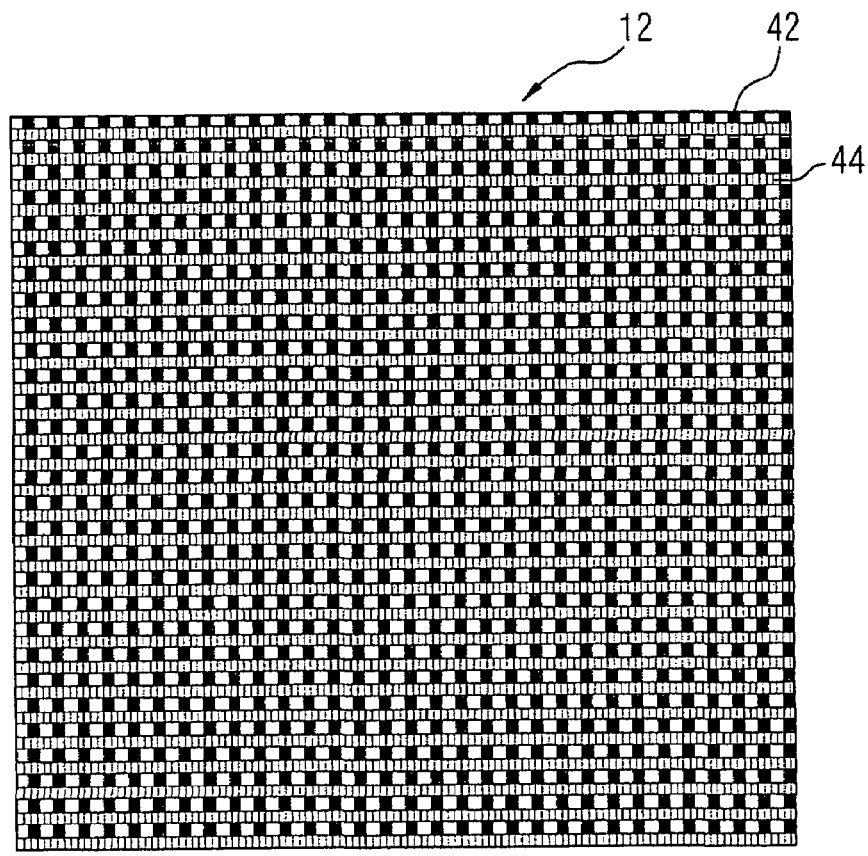

FLAT X-RAY DETECTOR AND METHOD FOR CONTROLLING THE IMAGE DOSE EMITTED BY AN X-RAY TUBE TO A FLAT X-RAY DETECTOR WHEN RECORDING AN X-RAY IMAGE

PRIORITY STATEMENT

The present application hereby claims priority under 35 U.S.C. §119 on German patent application number DE 10 2006 019 416.0 filed Apr. 26, 2006, the entire contents of which is hereby incorporated herein by reference.

FIELD

Embodiments of the invention generally relate to a flat X-ray detector and/or a method for controlling the image dose emitted by an X-ray tube to a flat X-ray detector when recording an X-ray image.

BACKGROUND

A flat X-ray detector conventionally has a scintillator that converts incident X-rays into light, and a light converting layer with detector elements that receive (pick up) the light from the scintillator and emit electrons for producing an image data value of the detector elements.

In the predecessor of the flat X-ray detector, the image intensifier, it was possible to measure the dose during the recording of an image, and so it was possible to control the image dose for recording an image.

Flat X-ray detectors have not so far themselves been capable of dose measurement. In the prior art, a dose measuring chamber is arranged in front of the flat X-ray detector. Such a typical chamber has three to five measurement fields, and is based on semiconductor technology. A disadvantage of such a chamber resides in that under certain circumstances it can be visible on the finished X-ray image. In order to avoid this, DE 103 13 602 A1 presents an absorption structure that is applied to a film backing and is very thin. This structure is also arranged between the X-ray tube and the flat X-ray detector.

SUMMARY

In at least one embodiment of the invention, a flat X-ray detector is equipped with the possibility of dose measurement such that there is no longer any need for a separate dosemeter.

According to at least one embodiment of the invention, the flat X-ray detector therefore includes at least one optical element that instead of guiding a fraction of the light from the scintillator to the detector elements, leads it to a photosensitive component that measures the light quantity guided to it by the optical element.

In other words, the light is branched off downstream of the scintillator but upstream of the detectors. Owing to the arrangement downstream of the scintillator, the measuring instrument need not detect X-radiation, but visible light.

A fiber optic element is suitable as optical element. Owing to the use of a fiber optics, it is possible to deflect the light into a direction entirely different from the direction in which it originally moves.

In accordance with an alternative embodiment, the optical element can be arranged directly on the light converting layer. The light converting layer can be, for example, a layer made from amorphous silicon in which the detector elements are constructed, or a CMOS layer. In both cases, conductor elements are provided in any case on the top side of the layer, and so optical elements can additionally be applied, for example parallel to the conductor elements. In order to fasten the optical element on the light converting layer, it is possible to use the adhesive with the aid of which the scintillator (the scintillator layer) is fastened on the light converting layer. The optical element can then be embedded in the adhesive.

In a further alternative, there is provided between the scintillator and the light converting layer a separate layer that is preferably transparent and preferably includes plastic or glass. The advantage of this embodiment is that a particularly large amount of space is available for the optical element. For example, the optical element can be embedded in the transparent layer, preferably cast into it. It can also be provided that the optical element is fastened in a cutout in the layer.

The flat X-ray detector defines a detector surface. In plan view, the optical elements are to appear distributed over the detector surface, and preferably to appear uniformly distributed. The optical elements can, for example, be designed at least partially as strips. The strips can extend from one end of the detector surface to the other end. They can also be of bent design, for example bent at right angles.

In a first embodiment, all the optical elements guide light to a common photosensitive component. The distribution of the optical elements over the detector surface then has the effect merely that signals of all the detector subregions feature in the final signal. Alternatively, it can also be provided that at least two optical elements guide light to different photosensitive components, something which can be extended so that all the optical elements respectively guide light to a photosensitive component. The result is that different measured values are recorded for various subregions of the detector independently of one another. These measured values are then weighted in a specific way during the evaluation.

A photocounter is suitable as photosensitive component. Individual light quanta can be detected thereby.

In the method according to at least one embodiment of the invention for controlling the image dose emitted by an X-ray tube to a flat X-ray detector when recording an X-ray image, for a predetermined period (that is smaller than the image recording period) during the recording of the X-ray image, at least one photosensitive component of the flat X-ray detector is used to determine a measured value relating to the light quantity so far reaching the photosensitive component, and is fed to an evaluation unit that generates as a function of the measured value as the image is being recorded control signals for fixing the image recording period, and/or control signals for changing an operating voltage of the X-ray tube.

The flat X-ray detector according to at least one embodiment of the invention thus renders it possible to measure the current dose as early as when recording an image, and this is used in the case of the method according to at least one embodiment of the invention in order to control the power output by the X-ray tubes.

When use is made of a flat X-ray detector having a plurality of photosensitive components, a measured value is obtained in each case with the aid of each photosensitive component, and the control signals are generated by the evaluation unit as a function of all the measured values. It is preferred here that various modes can be set at the evaluation unit that correspond to different weightings of the different measured values during the generation of the control signals.

An example embodiment is attended by a suitable distribution of the optical elements over the detector surface. The various modes at the evaluation unit then correspond to various image modes. If, for example, a skull is being imaged, the optical elements in the center of the detector surface are to be weighted otherwise than those at the edge, because less X-radiation occurs in the center (because of the absorption by the skull). The weighting must correspondingly differ when, for example, a lung is being imaged.

BRIEF DESCRIPTION OF THE DRAWINGS

Further example embodiments are described below with reference to the drawings, in which:

FIG. 4 illustrates an alternative embodiment of the design of a flat X-ray detector according to the invention, in cross section, and FIG. 5 shows a plan view of the silicon layer of the flat X-ray detector from FIG. 4 with optical elements.

DETAILED DESCRIPTION OF THE EXAMPLE EMBODIMENTS

Figure 1:
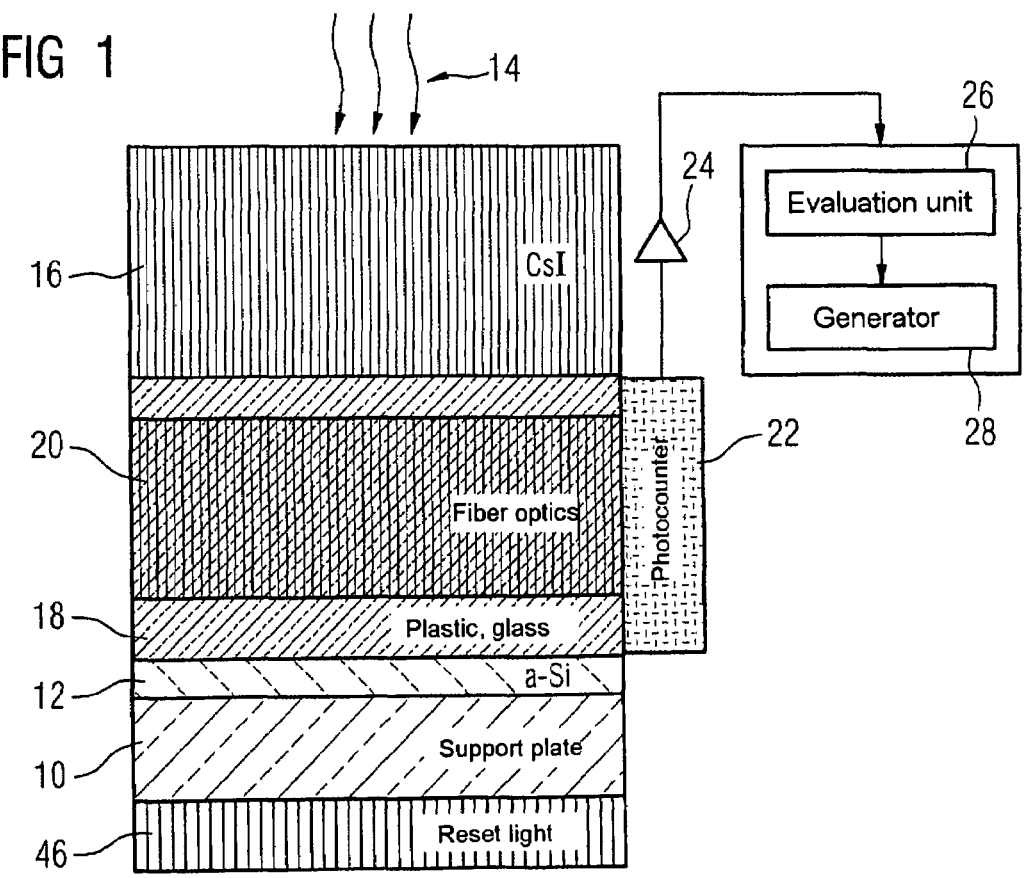
FIG. 1 illustrates the design of a flat X-ray detector according to an embodiment of the invention, in cross section.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates the design of a flat X-ray detector according to an embodiment of the invention in a cross sectional representation. In a known way, there is provided in the flat X-ray detector a support plate 10 that supports a layer 12 made from amorphous silicon. The actual detector elements are constructed in a way known per se in the layer made from amorphous silicon.

The detector elements convert light into electronic signals. The incoming X-radiation 14 is converted into such light in advance by a cesium iodide layer 16 that functions as scintillator. In conventional flat X-ray detectors, the cesium iodide layer is applied directly to the layer with amorphous silicon.

According to an embodiment of the invention, an additional layer 18, that is transparent to light, is provided between the cesium iodide layer 16 and the layer made from amorphous silicon 12. Fiber optic elements 20 are arranged in the layer 18. The fiber optic elements 20 permit a portion of the light to be branched off on the path from the cesium iodide layer 16 to the layer made from amorphous silicon 12, and to be guided to the edge of the flat X-ray detector. Arranged there is a photocounter 22 that counts the light quanta reaching it.

The fraction of the light quanta in relation to the totality of the light quanta generated by the cesium iodide layer 16 is predetermined by the geometry and the optical properties of the fiber optic elements 20. The number of the light quanta counted by the photocounter 22 is therefore a measure of the light quanta overall that are generated in the cesium iodide layer 16, and thus of the dose of the X-rays 14 striking the cesium iodide layer 16 (image dose).

The counting signal of the photocounter 22 is correspondingly fed to the amplifier 24, and from the latter to an evaluation unit 26 that controls a generator 28. During the recording of the image, which typically lasts 500 ms up to a few seconds, at least one counting can be carried out by way of the photocounter 22, for example in the first 50 ms. The measuring signal amplified by the amplifier 24 can then be evaluated in the evaluation unit 26.

The evaluation unit detects on the basis of predetermined criteria whether the image dose is too low, exactly correct or sufficient. As the image is being recorded, the evaluation unit can then generate control signals that influence the image dose. The generator 28 can effect a short term change in the supply voltage fed to an X-ray tube (that generates the X-rays 14, but is not shown). Again, the X-ray window can be enlarged or reduced. The X-ray window corresponds to the image recording period, that is to say the beam duration of the X-ray tube.

Figure 2A:
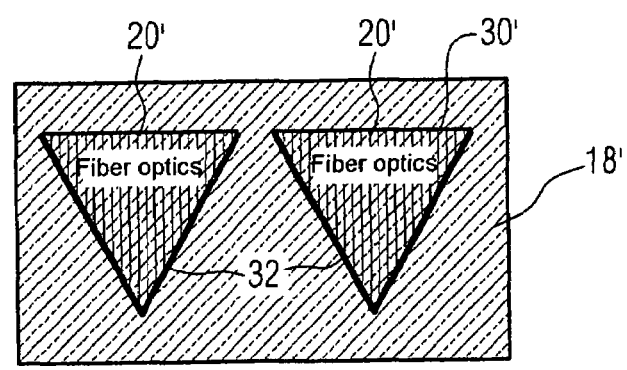
FIG. 2A and FIG. 2B illustrate embodiments in the configuration of the optical elements, in cross section.
Figure 2B:
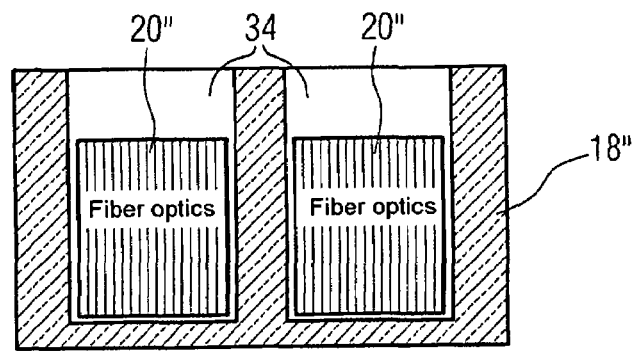

There are various embodiments as to how the fiber optics can be arranged in the layer 18. FIG. 2A and FIG. 2B illustrate different embodiments. The two figures illustrate the layer 18' and 18'', respectively, from the view of the photocounter 22. The optical fibers 20' form a triangular shape in the embodiment in accordance with FIG. 2A. At the top side 30 of the triangular shape, which points toward the cesium iodide layer 16, the arrangement is transparent to light. A reflecting coating 32 is provided at the two other limbs of the triangle, which point in the direction of the layer made from amorphous silicon 12. Light that thereby reaches the top side 30 penetrates the fiber optics 20' as far as the reflecting coating 32 and is then diverted on the basis of the optical laws in the direction of the photocounter 22. The embodiment in accordance with FIG. 2A is particularly suitable when the layer 18' is produced from plastic. The fiber optic elements 20' are then cast into the plastic layer 18' and are thus directly embedded in the layer.

An alternative embodiment is illustrated in FIG. 2B. This is intended, in particular, for the case when the layer 18'' is made of glass. Cutouts (shafts) 34 are provided in the glass. The shaft widths are in the range of 50 µm or less. Fiber optic elements 20'' are introduced into the shafts. They are either fastened in the shafts with the aid of a plastic transparent to light (not shown), or are introduced into the shafts which are then subsequently filled with a transparent filling material and thus sealed. The arrangement of fiber optic elements 20' preferably has a rectangular cross section in the embodiment from FIG. 2B.

Figure 3A:
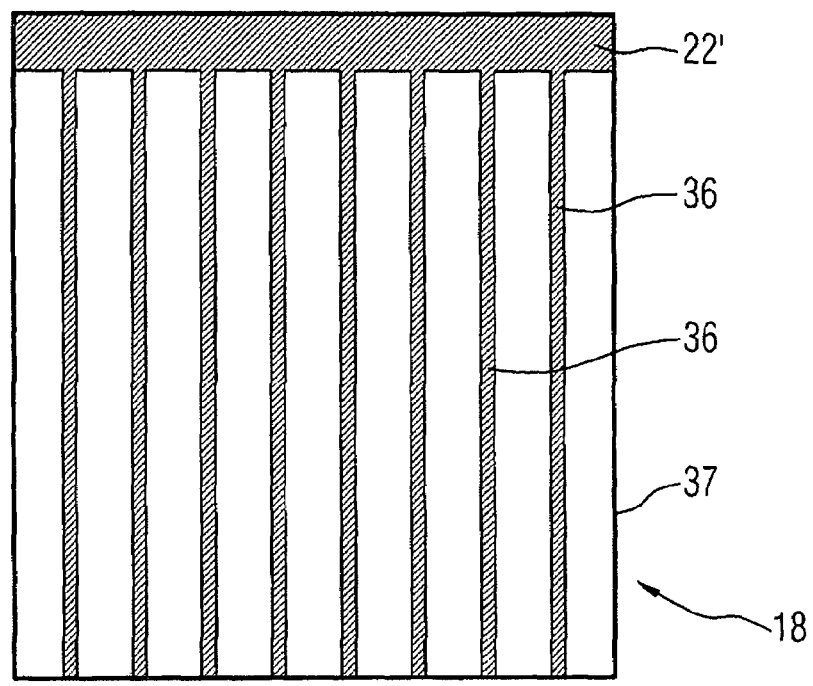
FIG. 3A and FIG. 3B are plan views of embodiments of the flat X-ray detector according to the invention that illustrate the distribution of the optical elements over the detector plane.
Figure 3B:
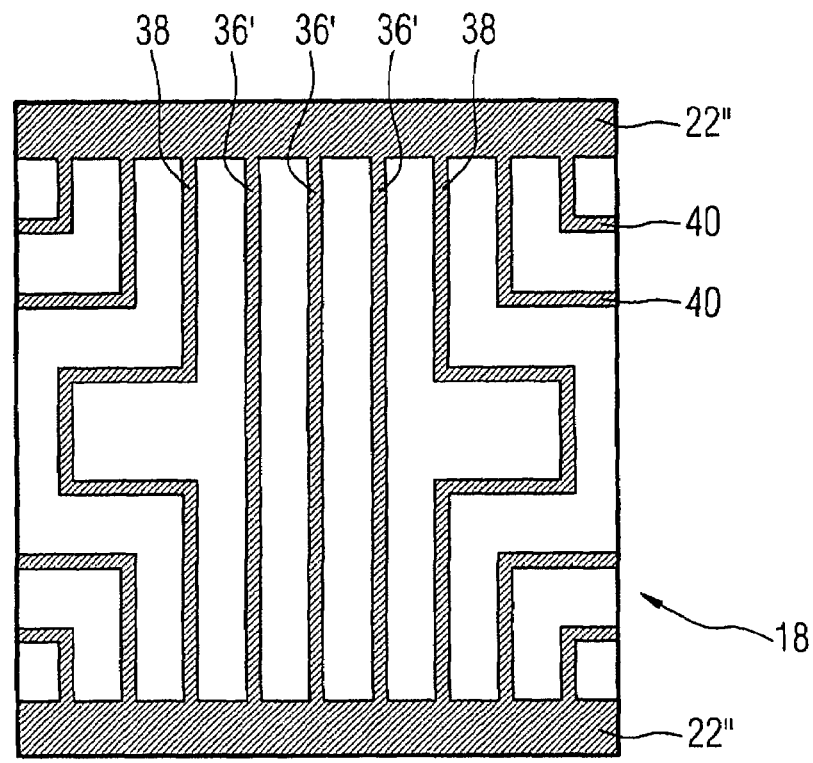

Since the light quantity detected by the fiber optic elements 20 is intended to be representative of the image dose, the fiber optic elements 20 should extend over the entire region of the flat X-ray detector. FIGS. 3A and 3B illustrate plan views of various embodiments of the configuration of the fiber optic elements. The view in FIGS. 3A and 3B is, as it were, from above onto the detector surfaces and through the scintillator layer 16.

FIG. 3A shows that a multiplicity of fiber optic elements 36 run in the shape of strips at a uniform spacing in a fashion distributed over the surface and parallel to the edges 38 of the rectangular flat X-ray detector. All the strip shaped fiber optic elements 36 lead to a single photocounter 22'. The uniform distribution of the fiber optic elements 36 over the surface ensures that the measured light quantity is representative of the total image dose.

The embodiment in accordance with FIG. 3B departs from the uniform distribution. Here, three rectilinear strips 36' are provided solely in the middle of the surface. Located next to the outer strips 36' is a strip 38 that bends once at right angles to the right, then twice at right angles to the left, and then once again at right angles to the right. L-shaped strips 40 are then located further to the outside. Two photocounters 20'' are provided at either end of the flat X-ray detector. The distribution of the strips 36', 38 and 40 takes account of the fact that in X-ray images the imaged structures are generally illustrated in a centered fashion such that more absorption results in the center.

The central regions (strips 36') therefore receive more strongly absorbed X-ray light than do the outer regions (strips 38 and 40), the fiber optic elements sending to the photocounters 22' a quantity of light quanta that is proportional to the X-ray light. This effect is compensated by the shape of the strips 36', 38, 40.

In the case of a modification that is not illustrated in FIG. 3B, it is also possible while retaining the strip structure unchanged to use more than the two photocounters 22', for example, each photocounter 22' can be divided into three partial photocounters, specifically one for the outer strips 40, one for the strips 36' and 38, and one for the further strips 40. The signals can then be differently weighted in the evaluation unit 26. The weighting can be a function of a mode setting at the evaluation unit 26. Thus, for example, when imaging a skull a center of gravity can be laid on the photocounters to be assigned to the strips 36' and 38, while the edge region with the strips 40 is neglected in the control because that is where the regions of no interest in the imaging are found.

FIG. 4 illustrates an alternative design of a flat X-ray detector in accordance with an embodiment of the invention, in cross section. In this alternative design, the layer 12 made from amorphous silicon is conventionally located on the support 10, and the cesium iodide layer 16 is located directly above the layer made from amorphous silicon. Here, as well, the fiber optic elements are to be arranged in the beam path from the layer 16 to the layer 12. This is done here by virtue of the fact that they are applied directly to the layer made from amorphous silicon such that they cannot be detected as such at all in the cross section in accordance with FIG. 4. They can, for example, be introduced into the adhesive that connects the caseium iodide layer 16 to the layer made from amorphous silicon 12.

Supply leads to the individual detector elements, which are arranged regularly, are usually located on the layer made from amorphous silicon. The supply leads form, for example, a honeycomb pattern such as is illustrated in FIG. 5, the individual supply leads that are visible being denoted by the reference number 42. The supply leads 42 extend fundamentally both in a horizontal and in a vertical direction. Only the supply leads 42 in a vertical direction are to be seen in FIG. 5.

Specifically, fiber optic elements 44 are located on the supply leads 42 in a fashion applied in a horizontal direction. The fiber optic elements 44 need not necessarily be applied directly to the supply leads, but can also be arranged directly next to the latter. In this case, there are usually edge regions at which sufficient space is available.

It is admittedly also possible here to arrange a photocounter at the lateral edge of the flat X-ray detector. It is preferred here to arrange the photocounter 22 below the support 10. Whereas in the case of the embodiment in accordance with FIG. 1 a reset light 46, an array of light emitting diodes that provide resetting light can be arranged below the support 10, in the case of the embodiment in accordance with FIG. 4 the photocounter 22 is arranged below the support plate 10. It is certainly true that the signals can also reach the photocounter 22 laterally at the support plate 10. However, the support plate 10 is preferably likewise transparent, and the fiber optic elements 44 are shaped such that they guide light past the detector elements in the layer made from amorphous silicon 12 via the support plate 10 to the photocounter 22.

The remaining design with amplifier 24, evaluation unit 26 and generator 28 is identical to the design from FIG. 1.

Whereas the embodiment in accordance with FIG. 1 requires quite another method of manufacture, because the additional layer 18 must be provided, the embodiment in accordance with FIG. 4 permits the customary production steps to be carried out when manufacturing a flat X-ray detector, it being necessary to insert the application of the fiber optic elements 44 only after the layer 12 has been applied to the support 10. The photocounter 22 must still be fitted under the support plate 10 at the end of the conventional production sequence.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A flat X-ray detector, comprising:
   a scintillator to convert incident X-rays into light;
   a light converting layer with detector elements to pick up the light from the scintillator and to emit electrons for producing an image data value of the detector elements; and
   at least one optical element to, instead of guiding a fraction of the light from the scintillator to the detector elements, guide the fraction of the light to a photosensitive component to measure the light quantity guided from the at least one optical element.

2. The flat X-ray detector as claimed in claim 1, wherein the at least one optical element is a fiber optic element.

3. The flat X-ray detector as claimed in claim 1, wherein the scintillator is fastened on the light converting layer with the aid of an adhesive, each of the at least one optical element being embedded in the adhesive.

4. The flat X-ray detector as claimed in claim 1, wherein the at least one optical element is arranged in a transparent layer that is located between the scintillator and light converting layer.

5. The flat X-ray detector as claimed in claim 4, wherein the at least one optical element is embedded in the transparent layer.

6. The flat X-ray detector as claimed in claim 4, wherein the at least one optical element is fastened in a cutout in the transparent layer.

7. The flat X-ray detector as claimed in claim 1, wherein the at least one optical element includes a plurality of optical elements, and wherein a detector surface Is formed over which the plurality of optical elements are distributed.

8. The flat X-ray detector as claimed in claim 7, wherein the plurality of optical elements are designed at least partially as strips.

9. The flat X-ray detector as claimed in claim 1, wherein the at least one optical element includes a plurality of optical elements, and wherein all the optical elements guide light to a common photosensitive component.

10. The flat X-ray detector as claimed in claim 1, wherein the at least one optical element includes a plurality of optical elements, and wherein at least two optical elements guide light to different photosensitive components.

11. The flat X-ray detector as claimed in claim 1, wherein the photosensitive component is a photocounter.

12. A method for controlling the image dose emitted by an X-ray tube to the flat X-ray detector as claimed in claim 1 when recording an X-ray image, that the method comprising:
    using, for a period during a recording of an X-ray image, at least one photosensitive component of the flat X-ray detector as claimed in claim 1 to determine a measured value relating to a light quantity so far reaching at least one the photosensitive component; and
    feeding the determined measured value to an evaluation unit to generate at least one of, as a function of the measured value as the X-ray image is being recorded, control signals for fixing the image recording period and control signals for changing an operating voltage of the X-ray tube.

13. The method as claimed in claim 12, wherein the at least one optical element includes a plurality of optical elements, and wherein at least two optical elements guide light to different photosensitive components, and wherein the measured value is obtained, in each case, with the aid of each photosensitive component, and wherein the control signals are generated by the evaluation unit as a function of all the measured values.

14. The method as claimed in claim 13, wherein the evaluation unit includes various modes corresponding to different weightings of the different measured values during the generation of the control signals.

15. The flat X-ray detector as claimed in claim 4, wherein the transparent layer comprises at least one of plastic and glass.

16. The flat X-ray detector as claimed in claim 5, wherein the optical element is cast into the transparent layer.

17. The flat X-ray detector as claimed in claim 7, wherein the plurality of optical elements are uniformly distributed.

18. A computer readable medium including program segments for, when executed on a computer device, causing the computer device to implement the method of claim 12.

* * * * *